US010037717B2

(12) United States Patent
Sargent et al.

(10) Patent No.: US 10,037,717 B2
(45) Date of Patent: Jul. 31, 2018

(54) PRINTABLE MAGNETIC LABEL TAPE, MAGNETIC LABEL, AND METHOD OF MAKING

(71) Applicant: MAGNUM MAGNETICS CORPORATION, Marietta, OH (US)

(72) Inventors: Jason Thomas Sargent, Vincent, OH (US); Trygve Paul Koren, Newport, OH (US); Ryan Ray Watters, Woodsfield, OH (US)

(73) Assignee: MAGNUM MAGNETICS CORPORATION, Marietta, OH (US)

(*) Notice: Subject to any disclaimer, the term of this patent is extended or adjusted under 35 U.S.C. 154(b) by 0 days.

(21) Appl. No.: 15/156,457

(22) Filed: May 17, 2016

(65) Prior Publication Data

US 2017/0337850 A1 Nov. 23, 2017

(51) Int. Cl.

| | |
|---|---|
| ***B32B 3/00*** | (2006.01) |
| ***G09F 3/00*** | (2006.01) |
| *B41J 2/32* | (2006.01) |
| *G09F 3/02* | (2006.01) |

(52) U.S. Cl.

CPC .......... *G09F 3/0291* (2013.01); *G09F 3/0297* (2013.01); *B41J 2/32* (2013.01); *G09F 2003/0201* (2013.01); *G09F 2003/023* (2013.01); *G09F 2003/0229* (2013.01); *G09F 2003/0257* (2013.01); *G09F 2003/0269* (2013.01)

(58) Field of Classification Search

CPC ................ G09F 3/0291; G09F 3/0293; G09F 2003/0201; G09F 2003/0229; G09F 2003/023; G09F 2003/0257; G09F 2003/0269; B41J 3/4075

See application file for complete search history.

(56) References Cited

U.S. PATENT DOCUMENTS

| | | | | |
|---|---|---|---|---|
| 4,188,251 A * | 2/1980 | Grass | B31D 1/021 | 156/248 |
| 2003/0077465 A1 * | 4/2003 | Boudouris | B32B 27/18 | 428/469 |
| 2007/0020423 A1 * | 1/2007 | Chamandy | G09F 3/10 | 428/40.1 |
| 2008/0304893 A1 * | 12/2008 | Picqueur | B41J 3/4075 | 400/613 |

* cited by examiner

*Primary Examiner* — Elizabeth E Mulvaney

(74) *Attorney, Agent, or Firm* — Vorys, Sater, Seymour and Pease LLP; William L. Klima

(57) ABSTRACT

A printable magnetic label tape including a magnetic first layer and a printable second layer. The printable magnetic label tape includes spaced apart transverse oriented lines of weakness along the length of the label tape. A printable magnetic label, and methods of making.

26 Claims, 4 Drawing Sheets

PRINTABLE MAGNETIC LABEL TAPE, MAGNETIC LABEL, AND METHOD OF MAKING

FIELD

A printable magnetic label tape, magnetic label, and method of making label tape and labels. The label tape is for use with a printer, in particular a thermal printer.

BACKGROUND

There exists a need for a printable magnetic label tape for use with a printer, in particular a thermal printer or thermal transfer printer. Further, there exists a need for a printable magnetic label tape that can be separated into labels by tearing, bending, or tearing and bending.

SUMMARY

The presently described subject matter is directed to an improved magnetic label tape.

The presently described subject matter is directed to an improved magnetic continuous roll product.

The presently described subject matter is directed to an improved magnetic continuous roll product configured to make magnetic labels.

The presently described subject matter is directed to an improved magnetic continuous roll product made with no notches on at least one edge, markings, perforations, and/or score lines.

The presently described subject matter is directed to an improved magnetic continuous roll product made with one or more notches on at least one edge, markings, perforations, and score lines.

The presently described subject matter is directed to a printable magnetic label tape.

The presently described subject matter is directed to a thermally printable magnetic label tape.

The presently described subject matter is directed to a printable magnetic tape comprising or consisting of a magnetic first layer connected to a printable second layer.

The presently described subject matter is directed to a printable magnetic tape comprising or consisting of a magnetic first layer adhered to a printable second layer.

The presently described subject matter is directed to a printable magnetic tape comprising or consisting of a magnetic first layer connected to a printable second layer, the first layer having a line of weakness.

The presently described subject matter is directed to a printable magnetic tape comprising or consisting of a magnetic first layer connected to a printable second layer, the second layer having a line of weakness.

The presently described subject matter is directed to a printable magnetic tape comprising or consisting of a magnetic first layer connected to a printable second layer, the first layer having a line of weakness and the second layer having a line of weakness.

The presently described subject matter is directed to a printable magnetic tape comprising or consisting of a magnetic first layer connected to a printable second layer, the first layer having a line of weakness and the second layer having a line of weakness overlapping the line of weakness of the first layer.

The presently described subject matter is directed to a printable magnetic tape comprising or consisting of a magnetic first layer connected to a printable second layer, the first layer having a transverse oriented line of weakness and the second layer having a transverse oriented line of weakness.

The presently described subject matter is directed to a printable magnetic tape comprising or consisting of a magnetic first layer connected to a printable second layer, the first layer having spaced apart transverse oriented lines of weakness located along a length of the tape and the second layer having spaced apart transverse oriented lines of weakness located along the length of the tape.

The presently described subject matter is directed to a printable magnetic tape comprising or consisting of a magnetic first layer connected to a printable second layer, the first layer having spaced apart transverse oriented score lines or perforation lines located along a length of the tape and the second layer having spaced apart transverse oriented score lines or perforation lines located along the length of the tape.

The presently described subject matter is directed to a printable magnetic tape comprising or consisting of a magnetic first layer connected to a printable second layer, the first layer having spaced apart transverse oriented score lines or perforation lines located along a length of the tape and the second layer having spaced apart transverse oriented score lines or perforation lines located along the length of the tape.

The presently described subject matter is directed to a printable magnetic tape comprising or consisting of a magnetic first layer connected to a printable second layer, the first layer having spaced apart transverse oriented score lines or perforation lines located along a length of the tape and the second layer having spaced apart transverse oriented score lines or perforation lines located along the length of the tape, the transverse oriented score lines or perforation lines of the first layer overlapping the transverse oriented score lines or perforation lines of the second layer.

The presently described subject matter is directed to a printable magnetic tape comprising or consisting of a magnetic first layer connected to a printable second layer, the first layer having spaced apart transverse oriented score lines or perforation lines located along a length of the tape and the second layer having spaced apart transverse oriented score lines or perforation lines located along the length of the tape, the transverse oriented score lines or perforation lines of the first layer overlapping the transverse oriented score lines or perforation lines of the second layer.

The presently described subject matter is directed to a printable magnetic tape comprising or consisting of a magnetic first layer connected to a printable second layer, the first layer having spaced apart transverse oriented score lines or perforation lines located along a length of the tape and the second layer having spaced apart transverse oriented score lines or perforation lines located along the length of the tape, the transverse oriented score lines or perforation lines of the first layer not overlapping the transverse oriented score lines or perforation lines of the second layer.

The presently described subject matter is directed to a printable magnetic tape comprising or consisting of a magnetic first layer connected to a printable second layer, the first layer having spaced apart transverse oriented score lines or perforation lines located along a length of the tape and the second layer having spaced apart transverse oriented score lines or perforation lines located along the length of the tape, the transverse oriented score lines or perforation lines of the first layer overlapping the transverse oriented score lines or perforation lines of the second layer, the score lines or perforation lines of the first layer extending into at least a portion of a thickness of the first layer.

The presently described subject matter is directed to a printable magnetic tape comprising or consisting of a magnetic first layer connected to a printable second layer, the first layer having spaced apart transverse oriented score lines or perforation lines located along a length of the tape and the second layer having spaced apart transverse oriented score lines or perforation lines located along the length of the tape, the transverse oriented score lines or perforation lines of the first layer overlapping the transverse oriented score lines or perforation lines of the second layer, the score lines or perforation lines of the first layer extending into at least a portion of a thickness of the second layer.

The presently described subject matter is directed to a printable magnetic tape comprising or consisting of a magnetic first layer connected to a printable second layer, the first layer having spaced apart transverse oriented score lines or perforation lines located along a length of the tape and the second layer having spaced apart transverse oriented score lines or perforation lines located along the length of the tape, the transverse oriented score lines or perforation lines of the first layer overlapping the transverse oriented score lines or perforation lines of the second layer, the score lines or perforation lines of the first layer extending into at least a portion of a thickness of the second layer.

The present described subject matter is directed to a printable magnetic label tape, a printable magnetic label, a printable magnetic label, a method of making the printable magnetic label tape, method of making a printable magnetic label, and a method of making a printable magnetic label.

The printable magnetic label tape, for example, can comprise a magnetic first layer connected to (e.g. adhered, laminated) a second printable layer. For example, an adhesive third layer is located between the first magnetic layer and second printable layer in the assembled label tape.

The magnetic first layer can be an elastomeric material embedded with magnetic particles. The magnetic first layer and be magnetized or magnetic receptive (i.e. non-magnetized or un-magnetized). If the magnetic first layer is un-magnetized, it can be magnetized post printing with a magnetizer.

The printable second layer can be a coating (e.g. single layer or multiple layers) and/or a separate layer or material such as paper, polypropylene film, vinyl film, PE, PET, or other suitable film or layer. The coating can have any color, glow in the dark, and/or have a metallic look. The shape and size of the printable second layer can be vary depending on the particular printer (e.g. thermal printer) to be used for printing the label tape.

If the printable second layer is a coating, this coating can be applied onto one surface of the magnetic first layer. The coating can have different coating thicknesses. For example, the coating can be applied by printing the printable second layer onto the magnetic first layer using different anilox rollers, with and without overprint varnish (OPV). The OVP provides a finish top coating that may or may not be used to smooth the printable surface, increase print adhesion, provided ultraviolet (UV) or other protective properties, or provide other augmentation of printable second or upper layer. Multiple passes/coatings may need to be applied to obtain desired properties for making the end product (i.e. with suitable smoothness, gloss, etc.).

The coating can be applied to be a continuous printable second layer, or can be applied to be discontinuous. For example, the coating is applied to define label portions on the magnetic first layer with breaks or voids between the label portions (i.e. no coating applied between label portions). These breaks or voids can be used for registering the label tape when printing the label tape with the printer.

The printable magnetic label tape can be made from a larger sheet of assembled material, and then slit into particular widths for different products. For example, the larger sheet of assembled material is made on a flat surface and slit into the printable magnetic tape. Alternatively, the large sheet of assembled material is slit as the larger sheet is wound into a roll format.

The printable magnetic label tape can be continuous (i.e. undisturbed layers), or can be provided with lines of weakness to provided separable labels from the printable magnetic label tape. For example, the lines of weakness can be score lines, grooves, perforation lines, or other types of lines of weakness oriented transverse and spaced apart along the length of the label tape to allow the label tape to be separated into individual labels such as printed labels or label to be printed. For example, the label tape can be torn, bend, or bend and torn to separate the individual labels apart. Alternatively, the printable magnetic label tape can be continuous and cut into individual labels, for example, by the printer.

The depth of the score lines in the label tape is critical. For example, if the score lines are too shallow, the label tape will not tear properly and/or the label tape will tear forming jagged edges. If the score lines are too deep, then the label tape will be structurally deficient, and undesirably or inadvertently fall apart when been handled, shipped and/or printed.

The thickness of the magnetic tape or magnetic continuous roll product is selected depending on the specifications of the particular printer being used to print on the magnetic tape or magnetic continuous roll product. For example, the tape or continuous roll product has a thickness of 14 mil to 16 mil.

The magnetic layer thickness and magnetic material strength (e.g. holding strength, pull strength, tensile strength) are integral properties of the magnetic tape or magnetic continuous roll product. The thickness of the magnetic layer and the strength of the magnetic material are selected so that the magnetic tape or magnetic continuous roll product has sufficient strength to withstand being painted, coated, and/or laminated, for example, with metals without movement from external applied force. For example, the magnetic tape or magnetic continuous roll product can have a zero air gap holding/pull strength of around 25 lbs/ft$^2$. The holding strength mainly depends on the magnetic material makeup or composition, level of magnetization, thickness of the magnetic layer, etc.

The magnetic layer can be provided with a printable upper layer (e.g. flexo printed or coated layer, laminated printable layer of paper, film, composite layer material). The magnetic layer can also be provided with a lower layer (e.g. flexo printed or coated layer using an anilox roll). For example, the lower layer can be made of an acrylic based material, styrene acrylic copolymers material, silicone-acrylate material, silicon-epoxy material, etc.

DETAILED DESCRIPTION

Figure 1:
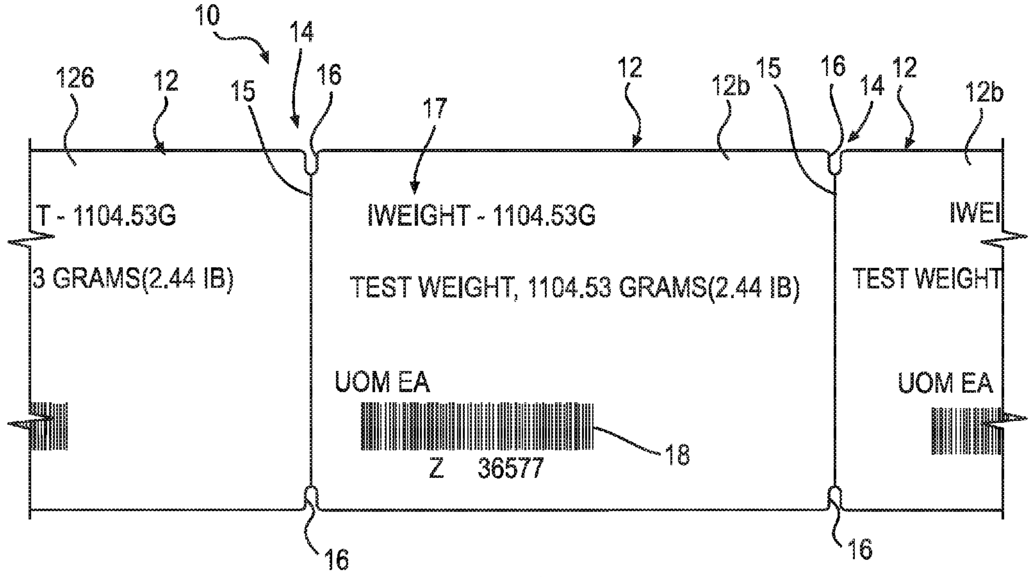
FIG. 1 is a planar view of the printable magnetic label tape according to the present invention.
Figure 2:
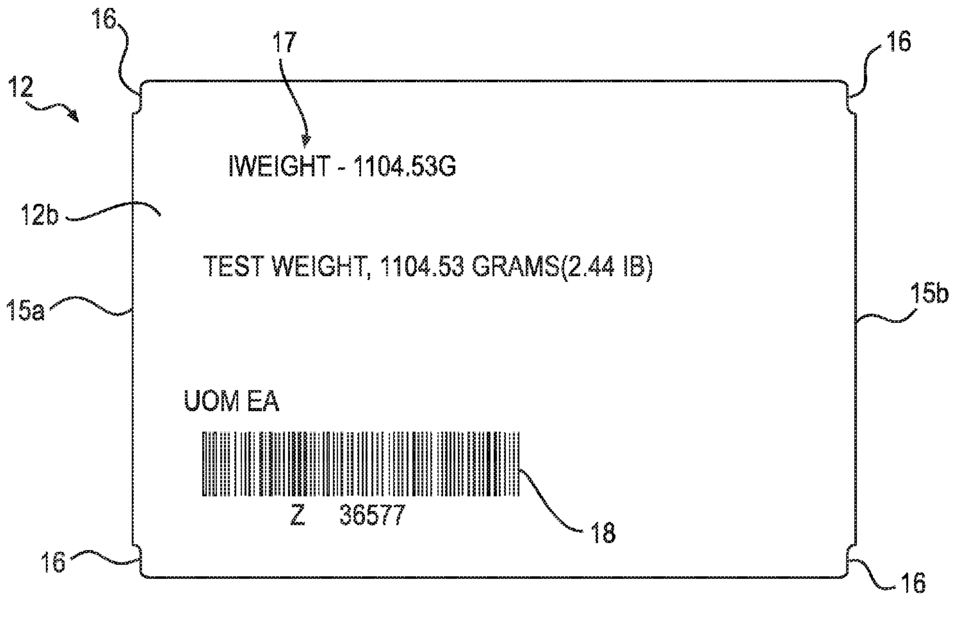
FIG. 2 is a planar view of the printable magnetic label separated from the printable magnetic label tape shown in FIG. 1.

A printable magnetic label tape 10 according to the present invention is shown in FIG. 1. The printable magnetic label tape 10 comprises a plurality of successive separable labels 12 positioned along the length of the label tape 10. A label 12 separated from the label tape after printing is shown in FIG. 2.

The printable magnetic label tape 10 comprises separable labels 12 connected together along spaced apart lines of weakness 14 located along the length of the label tape 10. For example, the lines of weakness 14 are oriented transverse relative to the length of the label tape 10.

The lines of weakness 14, for example, can be score lines, grooves, grooves made by score lines, perforations lines, spaces or separations, or combinations thereof. For example, the score lines can extend partially through a thickness of the label tape 10 from one side or both sides of the label tape 10.

The depth of the score lines or grooves in the label tape 10 is critical. If the score lines or grooves are too shallow, the label tape 10 cannot be separated into printed labels 12. If the score lines or grooves are too deep, the label tape 10 becomes structurally unstable and subject to breakage during handling or printing of the label tape 10. For example, the score lines or grooves can completely extending through the thickness of the printable second layer 12*b* and only partially through the thickness of the magnetic first layer 12*a*. For example, the score lines or grooves are made to be 40% to 60% of the thickness of the magnetic first layer. For example, the score lines or grooves are made to be 45% to 55% of the thickness of the magnetic first layer. For example, the score lines or grooves are made to be 50% of the thickness of the magnetic first layer.

The label tape 10 further comprises spaced apart notches 16 provided along both edges of the label tape 14 along the length thereof. Alternatively, the notches 16 can be located along only one edge of the label tape 10. The notches 16 are configured to be detected by a printer (e.g. thermal printer) loaded with the label tape 10 so that the printer can register the printing of the labels 12. For example, the notches are located and aligned with the lines of weakness 14 to locate the separable edges of the labels 12. In this manner, the printer can then register the label tape 10 using the notches 16, for example, to center the printing on each label 12 being successively printed on by the printer 12. Alternatively, the notches 16 can be located on the label tape 10 at a different location, for example, at the center of each separable label 12 along the edge of the label tape 10. Alternatively, or in addition, the notches 16 can be replaced with holes, slots, and/or markings (e.g. printed markings) provided on or in the label tape 10 for registering the label tape 10 with the printer. More specifically, the notches and/or markings can be used as proximity markings so that the sensor(s) of the printer (e.g. thermal transfer printer) recognize the start/stop positioning to allow proper jogging of the label based on the size/print of the label.

As shown in FIG. 1 the labels 12 are printed with printed matter 17, including text and a barcode 18.

Figure 3:
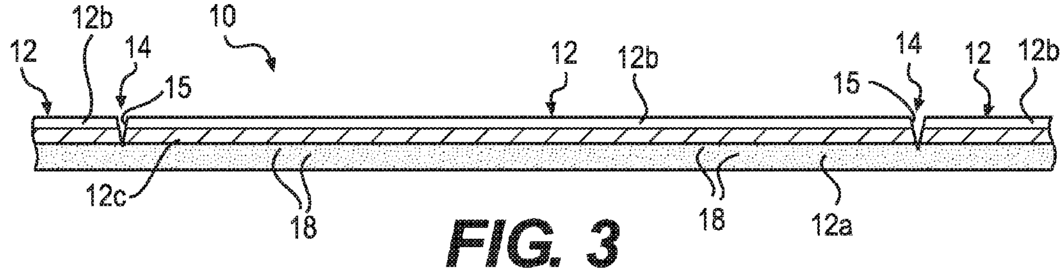
FIG. 3 is a center longitudinal cross-sectional view of the printable magnetic label tape shown in FIG. 1.

As shown in FIG. 3, the label tape 10 comprises a magnetic first layer 12*a* connected (e.g. adhered) to a printable second layer 12*b* by an adhesive layer 12*c*. For example, the printable second layer 12*b* can be a thermally printable layer. The magnetic first layer 12*a* can be an already magnetized layer or a magnetic receptive layer. The magnetic first layer 12*a* comprises magnetizable particles 18 embedded is a substrate material. For example, a suitable magnetic layer for the magnetic first layer 12*a* can be various grades or types of ferrite bound within a thermoplastic elastomer compound mixture that may consist of materials such as copolymers, elastomer polymers (e.g. EVA), thermoplastic polyolefins (e.g. LDPE), and polyolefin elastomers (e.g. PIB, isotactic propylene), synthetic rubbers (e.g. butyl, nitrile, styrene-butadiene), chlorinated or sulfonated polyolefins (e.g. CPE, Hailon, Hypalon), various mixing agents, antioxidants, fillers, etc. The compounds may be premixed, milled, and/or mixed and then either extruded or calendared.

The adhesive layer can be a continuous layer or a discontinuous layer (e.g. dots, matrix, rectangles, circles, different shapes of applied adhesive). Alternatively, the adhesive layer 12*c* can be eliminated if the materials of the magnetic first layer 12*a* and printable second layer 12*b* are such that they can be laminated together without adhesive.

The label tape 10 comprises the magnetic first layer 12*a* and the printable second layer 12*b*. The magnetic first layer 12*a* comprises magnetic particles 18 embedded within one or more substrate materials. The magnetic first layer 12*a* can be magnetized or non-magnetized or un-magnetized. The printable second layer 12*b* can be one or more coatings (e.g. multiple coating layers) applied to the magnetic first layer 12*a* (e.g. by printing, gravure printing, applied by anilox roll). For example, the coating can be a heat resistant styrene-acrylic polymer. Wax may be added for scratch/scuff resistance along with a filler (e.g. clay, silica) to improve receptivity of the thermal transfer ribbon/resin. Specific coatings are selected to meet desired end use such as chemical/oil resistance, scratch resistance, UV resistance, dimensional stability (e.g. to "lay-flat"), temperature/moisture resistance, appearance (e.g. color), surface finish (e.g. gloss, semi-gloss, flat finish), reflective, metallic, printed wood grain, and glow-in-the-dark property. Further, the coating can be made with or without surfactants. Alternatively, the printable second layer 12*b* can be a film or laminate. For example, the film or laminate can be paper, polyethylene (PE), polypropylene (PP), vinyl, polyethylene terephthalate (PET), laminated or adhered to the magnetic first layer 12*a*. The particular film is selected to meet desired end us such as chemical/oil resistance, appearance (e.g. color), surface finish (e.g. gloss, semi-gloss, matte), reflective, metallic, printed wood grain, and glow-in-the-dark property.

Figure 4:
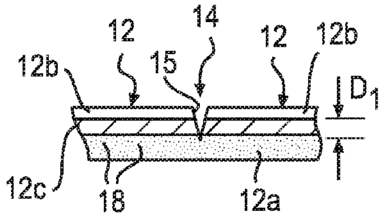
FIG. 4 is a broken away longitudinal cross-sectional view of another printable magnetic label tape according to the present invention.

A detailed view of a line of weakness 14 of the label tape 10 is shown in FIG. 4. For example, the line of weakness 14 can be a groove 15 extending completely through the thickness of the printable second layer 12*b* and partially through the thickness of the magnetic first layer 12*a*. The groove 15 can be created in various manners. For example, the groove 15 can be a score line created by using a scoring tool on the upper surface of the label tape 10. For example, the scoring tool use can have various profiles to provide particular profiles of the groove created by the scoring tool. In FIG. 2, for example, the scoring tool can have a V-shaped profile to create the groove 15, as shown, having a V-shaped profile. Alternatively, the V-shaped groove 15 can be machined (e.g. milled, water jet, laser), pressed, punched (e.g. using punch tool), cut (e.g. using rotary knife, circular cutting tool, saw), etched, or formed by other suitable methods or processes.

Figure 5:
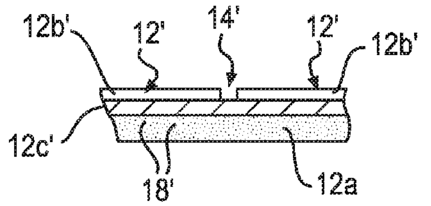
FIG. 5 is a broken away longitudinal cross-sectional view of a further printable magnetic label tape according to the present invention.

A detailed view of another line of weakness 14' of the label tape 10' is shown in FIG. 5. The line of weakness 14', for example, is a full depth groove 15' extending completely through the thickness of the printable second layer 12*b*' or a gap or space (i.e. separation) between separate printable second layers 12*b*' 12*b*' of the adjacent labels 12', 12'. For example, the groove 15' can be made in the printable second layer 12*b*' after assembly of the magnetic first layer 12*a* and the printable second layer 12*b*. Alternatively, the printable second layer 12*b*' is made into separate portions or pieces prior to assembly with the magnetic first layer 12*a*', and applied so as to create the space or gap defining the groove 15' located between the separate adjacent printable second layers 12*b*', 12*b*'.

Figure 6:
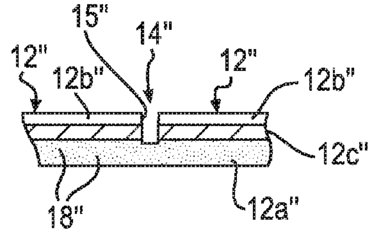
FIG. 6 is a broken away longitudinal cross-sectional view of an even further printable magnetic label tape according to the present invention.

A detailed view of a further line of weakness 14" of the label tape 10" is shown in FIG. 6. The line of weakness 14", for example, is a full depth groove 15" extending completely through the thickness of the printable second layer 12*b*" and extending partially through the thickness of the magnet first layer 12*a*". For example, the groove 15" has a U-shaped profile. The U-shaped groove 15" can be machined (e.g. using a mill, water jet, laser or groove making tool), pressed, punched (e.g. using punch tool), cut (e.g. using rotary knife, circular cutting tool, saw), etched, or formed by other suitable methods or processes.

Figure 7:
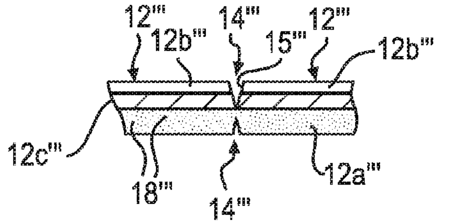
FIG. 7 is a broken away longitudinal cross-sectional view of another further printable magnetic label tape according to the present invention.

A detailed view of a further line of weakness 14'" of the label tape 10'" is shown in FIG. 7. The line of weakness 14'", for example, is a full depth groove 15'" extending completely through the thickness of the printable second layer 12*b*'" and extending partially through the thickness of the magnet first layer 12*a*'". For example, the groove 15'" has a U-shaped profile. The U-shaped groove 15'" can be machined (e.g. using a mill, water jet, laser or groove making tool), pressed, punched (e.g. using punch tool), cut (e.g. using rotary knife, circular cutting tool, saw), etched, or formed by other suitable methods or processes.

Figure 8:
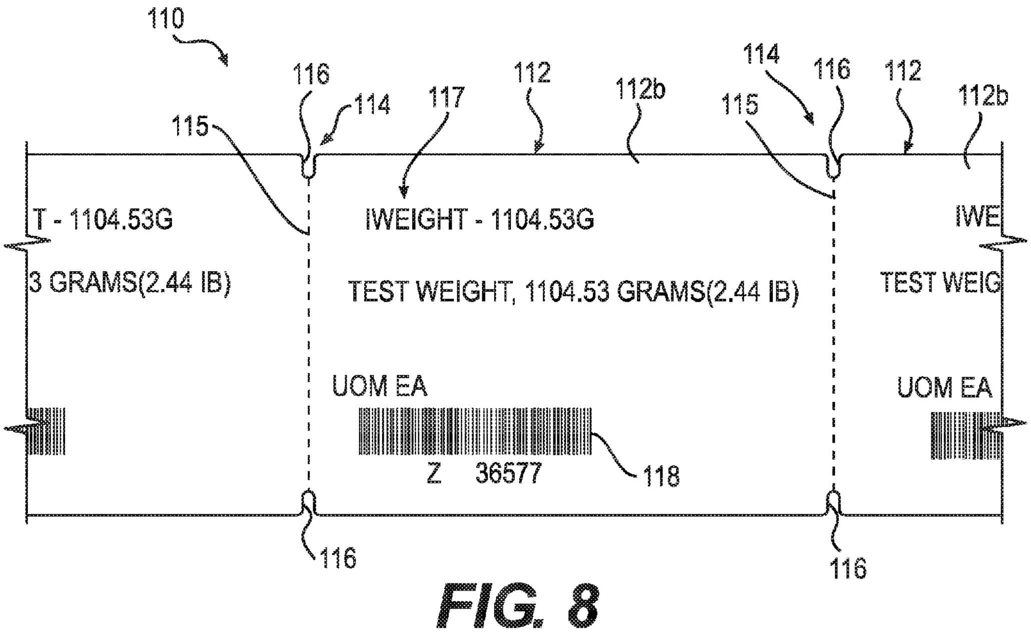
FIG. 8 is a planar view of another printable magnetic label tape according to the present invention.

Another printable magnetic label tape 110 according to the present invention is shown in FIG. 8.

The printable magnetic label tape 110 comprises separable labels 112 connected together along spaced apart lines of weakness 114 located along the length of the label tape 110. For example, the lines of weakness 114 are oriented transverse relative to the length of the label tape 110.

The lines of weakness 114, for example, can be perforation lines comprising a plurality of perforations 115 located along a line. For example, the perforations 115 can be partial or full thickness perforations through the thickness of the printable second layer 112*b*, and partial or full thickness perforations through the thickness of the magnetic first layer 112*a*. The lines of perforations 114 provide lines of weakness of the label tape 110 to allow the labels 112 to be separated (e.g. by tearing, bending, or bending and tearing).

The label tape 110 further comprises spaced apart notches 116 located along both edges of the label tape 114 along the length thereof. Alternatively, the notches 116 can be located along only one edge of the label tape 110. The notches 116 are configured to be detected by a printer (e.g. thermal printer) loaded with the label tape 110 so that the printer can register the printing of the labels 112. For example, the notches are located and aligned with the lines of weakness 114 to locate the separable edges of the labels 112. In this manner, the printer can then register the label tape 110 using the notches 116, for example, to center the printing on each label 112 being successively printed on by the printer 112. Alternatively, the notches 116 can be located on the label tape 110 at a different location, for example, at the center of each separable label 112 along the edge of the label tape 110. Alternatively, or in addition, the notches 116 can be replaced with holes, slots, and/or markings (e.g. printed markings) provided on or in the label tape 110 for registering the label tape 110 with the printer.

Figure 9:
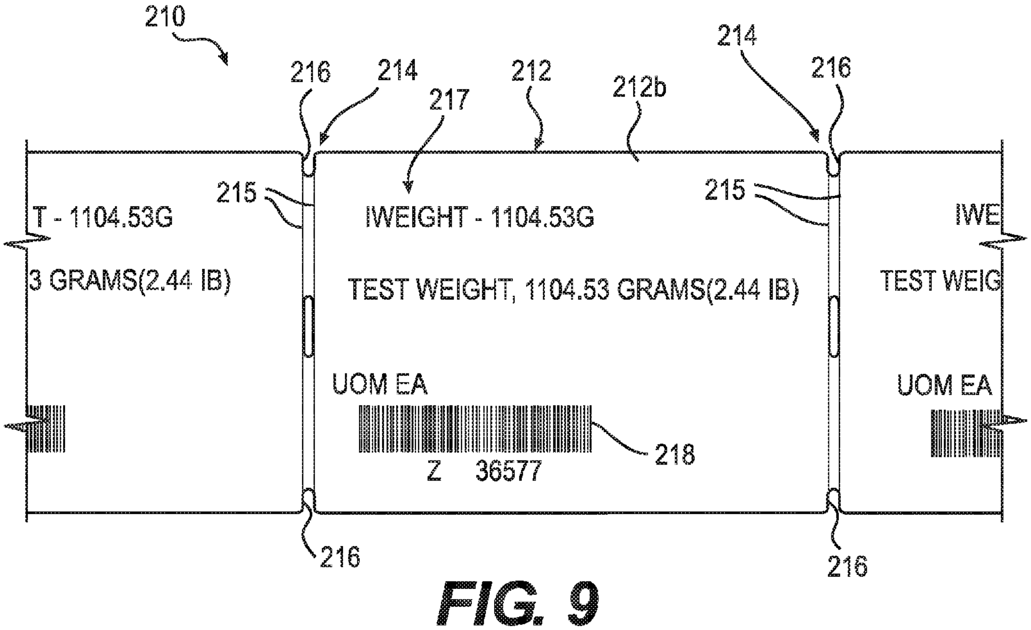
FIG. 9 is a planar view of a further printable magnetic label tape according to the present invention.

A further printable magnetic label tape 210 according to the present invention is shown in FIG. 9.

The printable magnetic label tape 210 comprises separable labels 212 connected together along spaced apart lines of weakness 214 located along the length of the label tape 210. For example, the lines of weakness 214 are oriented transverse relative to the length of the label tape 210.

The lines of weakness 214, for example, can be perforation lines comprising a plurality of perforations 215 located along a line. For example, the perforations 215 can be partial or full thickness perforations extending through the thickness of the printable second layer 212*b*, and partial or full thickness perforations extending through the thickness of the magnetic first layer 212*a*. For example, the perforations 215 extend through the thickness of the label tape 210. The lines of perforations 214 provide lines of weakness of the label tape 210 to allow the labels 212 to be separated (e.g. by tearing, bending, or bending and tearing).

The label tape 210 further comprises spaced apart notches 216 located along both edges of the label tape 214 along the length thereof. Alternatively, the notches 216 can be located along only one edge of the label tape 210. The notches 216 are configured to be detected by a printer (e.g. thermal printer) loaded with the label tape 210 so that the printer can register the printing of the labels 212. For example, the notches are located and aligned with the lines of weakness 214 to locate the separable edges of the labels 12. In this manner, the printer can then register the label tape 10 using the notches 16, for example, to center the printing on each label 12 being successively printed on by the printer 12. Alternatively, the notches 16 can be located on the label tape 10 at a different location, for example, at the center of each separable label 12 along the edge of the label tape 10. Alternatively, or in addition, the notches 16 can be replaced with slots 217 centered along and aligned with the lines of weakness 214 for registering the label tape 210 with the printer. The slots 217 can be replaced with multiple slots and/or through holes along the lines of weakness 214, or located at other locations on the label tape 210.

EXAMPLE #1

Figure 10:
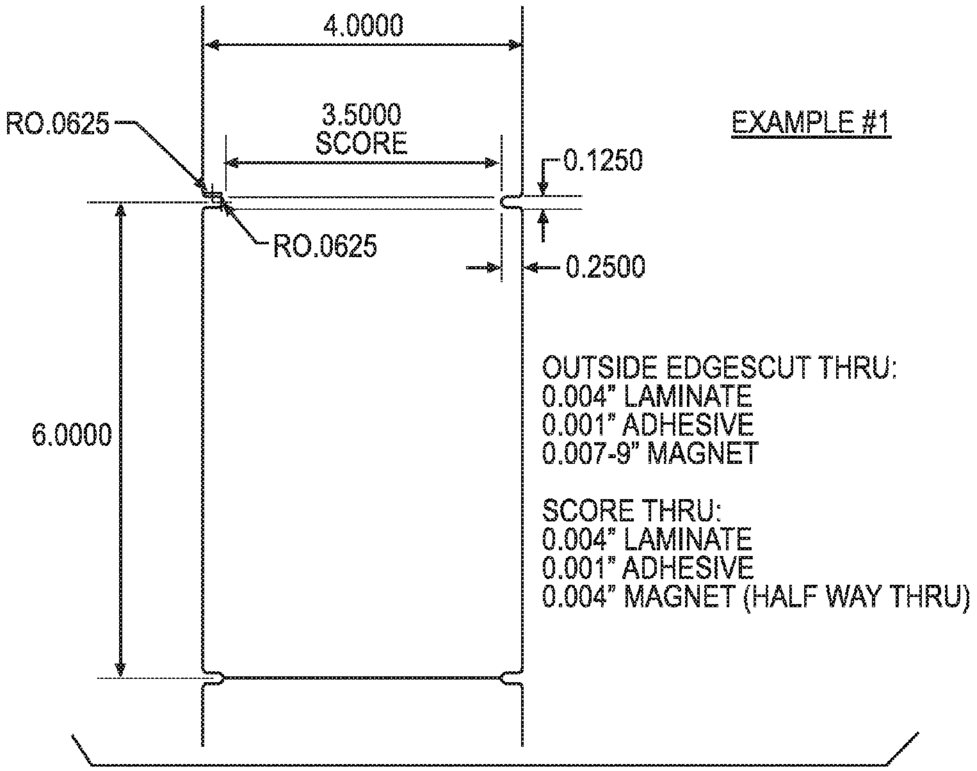
FIG. 10 is a planar view of Example #1 of a printable label according to the present invention.

A label tape according to the present invention is shown in FIG. 10. The label tape includes a label having a 6.0000 inch length and a 4.0000 inch wide. The lines of weakness defining the label are each provided by a 3.5000 score line.

The score line can be a single score line shown at the bottom of the label, or can be a double score line (i.e. pair of closely spaced apart score lines) shown at the top of the label. The single score line results in the label having a portion (i.e. ½ portion) of the notches remaining in the bottom corners of the label. The double score line results in the label having no remaining portion of the notches resulting in rounded upper corners of the label. For example, the top edge and bottom edge of the label can have corners with notch portions, if single scores lines are used at the top and bottom of the label. Alternatively, the top edge and bottom edge of the label can have rounded corners, if double scores lines are used at the top and bottom of the label. The double score lines at the top of the label are shown to be spaced apart 0.1240 inch.

The notches are provided through the complete thickness of the label tape shown. The label tape comprises a 0.004 inch thick laminate (i.e. printable layer), a 0.001 inch thick adhesive layer; and a 0.007-9 inch thick magnetic (i.e. magnetic layer).

The scores lines extend 0.004 inch deep into the laminate (i.e. extending completely through the thickness of the laminate layer), 0.001 inch deep into the adhesive (i.e. extending completely through the thickness of the adhesive layer), and 0.004 inch deep into the magnet (i.e. extending partially (½) through the thickness of the magnetic layer). The score lines are applied to the forward side (i.e. printable side) of the label tape.

Method

Figure 11:
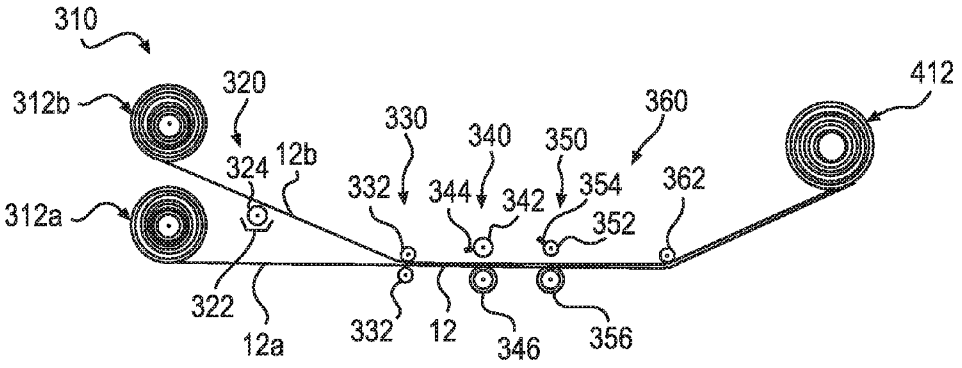
FIG. 11 is a diagrammatic side view illustrating a method of making a printable magnetic label tape according to the present invention.

A method of making the label tape 12 is shown in FIG. 11. A roll 312*a* of the magnetic first layer 12*a* is provided along with a roll 312*b* of the printable second layer 12*b*.

At station 320, adhesive from tray 322 is applied to adhesive roller 324 to then apply a coat of adhesive to one side of the printable second layer 12*b*. Alternatively, or in addition, adhesive can be applied to one side of the magnetic first layer 12*a* (e.g. by a different adhesive tray and adhesive roller).

At station 330, the magnetic first layer 12*a* and the second layer 12*b* are adhered together by pinching rollers 332. The pinching rollers 332 define a nip to apply pressure to the label tape 12 being formed thereby.

At station 340, the notches 16 are cut into the label tape 12 via using a fly cutter including roller 342 with blade 344 and a platen roller 346 having a resilient cover (e.g. made of polyurethane). Station 340 is configured to provide spaced apart notches 16 along the edges of the label tape 10. The notches are cut through the entire thickness of the label tape 10.

At station 350, the transverse oriented groove 15 (i.e. line of weakness) is cut into the label tape 12 using a fly cutter including a roller 352 with blade 354 and a platen roller 356 having a resilient cover (e.g. made of polyurethane). Station 350 is configured to provide spaced apart transverse oriented grooves along the length of the label tape 12. The blade 344 of the fly cutter cuts completely through the entire thickness of the printable second layer 12*b* and adhesive layer 12*c*, and partially through the thickness of the magnetic first layer 12*a*.

At station 360, a roller 362 diverts the direction of the assembled label tape of separable labels 12 upwardly at an angle to a reeler for taking up the assembled label tape.

Alternatively, stations 340 and 350 can be combined into a single station. For example, a notch or notches along with a score line are cut into the label simultaneously with the same rotary die. For example, the rotary die can be built with multiple "ups" (e.g. 2 ups, 3 ups, etc.).

The invention claimed is:

1. A printable magnetic label tape configured for use with a thermal printer, the tape comprising:

a first layer comprising a magnetic or magnetic receptive material, the first layer having spaced apart transverse oriented lines of weakness located along a length of the tape to define separable labels;

a thermally printable second layer, the second layer having spaced apart transverse oriented lines of weakness located along the length of the tape to further define the separable labels; and an adhesive connecting the first layer to the second layer together.

2. A printable magnetic label tape configured for use with a thermal printer, the tape comprising:

a first layer comprising a magnetic or magnetic receptive material, the first layer having spaced apart transverse groove lines located along a length of the tape to define separable labels connected together, the groove lines in the first layer only partially extend through a thickness of the first layer;

a thermally printable second layer, the second layer having spaced apart transverse oriented groove lines located along the length of the tape to further define the separable labels connected together, the groove lines in the second layer completely extend through a thickness of the second layer, the groove lines in the second layer are located at same positions of the groove lines in the first layer;

an adhesive connecting the first layer to the second layer together; and notches spaced apart along both edges of the tape and aligned with the groove lines in the first layer and second layer to further define the separable labels connected together, wherein the tape is configured for a user to tear apart the separable labels after thermally printing the tape.

3. The tape according to claim 1, wherein the lines of weakness are groove lines provided at least partially through the thickness of the first layer and second layer.

4. The tape according to claim 1, wherein the lines of weakness of the first layer are defined by groove lines provided at least partially through the thickness of the first layer.

5. The tape according to claim 1, wherein the lines of weakness of the second layer are defined by groove lines provided at least partially through the thickness of the second layer.

6. The tape according to claim 4, wherein the lines of weakness of the second layer are defined by groove lines provided at least partially through the thickness of the second layer.

7. The tape according to claim 1, wherein the lines of weakness of the first layer are located at same positions as the lines of weakness of the second layer.

8. The tape according to claim 1, wherein the lines of weakness of the first layer are located at different positions as the lines of weakness of the second layer.

9. The tape according to claim 3, wherein the groove lines are formed by scoring the first layer and second layer.

10. The tape according to claim 3, wherein the groove lines are separation lines between separate portions of at least one of the first layer and second layer.

11. The tape according to claim 3, wherein the groove lines are provided only on one side of the tape.

12. The tape according to claim 11, wherein the groove lines are provided on the side of the tape having the second layer.

13. The tape according to claim 12, wherein the groove lines in the second layer extend completely through the second layer.

14. The tape according to claim 12, wherein the groove lines in the second layer extend completely through the second layer into the first layer, and extend only partially through the first layer.

15. The tape according to claim 3, wherein the groove lines in the second layer extend completely through a thickness of the second layer.

16. The tape according to claim 3, wherein the groove lines in the first layer extend into the first layer to a depth from 40% to 60% of a thickness of the first layer.

17. The tape according to claim 3, wherein the groove lines in the first layer extend into the first layer to a depth from 45% to 55% of a thickness of the first layer.

18. The tape according to claim 3, wherein the groove lines in the first layer extend into the first layer to a depth of about 50% of a thickness of the first layer.

19. The tape according to claim 1, wherein the lines of weakness are defined by perforated lines.

20. The tape according to claim 1, further comprising a registration device configured for registering the tape relative to the thermal printer.

21. The tape according to claim 1, wherein the registration device comprises spaced apart notches disposed along at least one edge of the tape.

22. The tape according to claim 21, wherein the notches are registered relative to the at least one of the lines of weakness in the first layer and second layer.

23. The tape according to claim 22, wherein the notches are aligned with at least one of the lines of weakness in the first layer and second layer.

24. A method of making a printable magnetic label tape configured for use with a thermal printer, the method comprising:

providing a first layer comprising a magnetic or magnetic receptive material;

providing spaced apart transverse groove lines in the first layer located along a length of the tape to define separable labels connected together, the groove lines in the first layer only partially extend through a thickness of the first layer;

providing a thermally printable second layer;

providing spaced apart transverse oriented groove lines in the second layer located along the length of the tape to further define the separable labels connected together, the groove lines in the second layer completely extending through a thickness of the second layer, the groove lines in the second layer are located at same positions of the groove lines in the first layer;

applying adhesive to at least one of the first layer to the second layer;

adhering the first layer and second layer together;

providing notches spaced apart along both edges of the tape and aligned with the groove lines in the first layer and second layer to further define the separable labels connected together.

25. The method according to claim 24, wherein the groove lines in the first layer and the second layer are provided at one station, and the notches along both edges of the tape are made at another station.

26. The method according to claim 24, wherein the groove lines in the first layer and the second layer are provided at one station, and the notches along both edges of the tape are made at the same one station.

* * * * *